US010735601B2

(12) United States Patent
Morita

(10) Patent No.: US 10,735,601 B2
(45) Date of Patent: Aug. 4, 2020

(54) IMAGE PROCESSING APPARATUS AND PROGRAM

(71) Applicant: Konica Minolta Inc., Tokyo (JP)

(72) Inventor: Keisuke Morita, Akishima (JP)

(73) Assignee: Konica Minolta, Inc., Tokyo (JP)

( * ) Notice: Subject to any disclaimer, the term of this patent is extended or adjusted under 35 U.S.C. 154(b) by 123 days.

(21) Appl. No.: 16/161,834

(22) Filed: Oct. 16, 2018

(65) Prior Publication Data

US 2019/0149669 A1     May 16, 2019

(30) Foreign Application Priority Data

Nov. 16, 2017   (JP) ................................. 2017-220865

(51) Int. Cl.
*H04N 1/00* (2006.01)
*G06T 7/00* (2017.01)
*G06F 3/12* (2006.01)

(52) U.S. Cl.
CPC ....... *H04N 1/00029* (2013.01); *G06F 3/1208* (2013.01); *G06F 3/1256* (2013.01); *G06T 7/0002* (2013.01); *H04N 1/0044* (2013.01)

(58) Field of Classification Search
CPC .............. G06F 3/1208; G06F 3/1256; G06T 2207/10008; G06T 2207/30168; G06T 7/0002; G06T 7/001; H04N 1/00029; H04N 1/0044
See application file for complete search history.

(56) References Cited

U.S. PATENT DOCUMENTS

| 2004/0066526 A1* | 4/2004 | Inoo | H04N 1/00029 |
| | | | 358/1.14 |
| 2011/0129158 A1* | 6/2011 | Sato | H04N 1/32101 |
| | | | 382/218 |
| 2015/0221077 A1* | 8/2015 | Kawabata | G06T 7/337 |
| | | | 382/141 |
| 2016/0231964 A1* | 8/2016 | Oki | H04N 1/047 |
| 2018/0086049 A1* | 3/2018 | Ueshima | B41J 2/2142 |

(Continued)

FOREIGN PATENT DOCUMENTS

| CN | 105867086 A | 8/2016 |
| JP | 2014155193 A2 | 8/2014 |
| JP | 2015174307 A2 | 10/2015 |

(Continued)

OTHER PUBLICATIONS

Chinese Office Action dated Oct. 8, 2019 issued in the corresponding Chinese patent application No. 201811343212.4 and its English translation.

*Primary Examiner* — David Bilodeau
(74) *Attorney, Agent, or Firm* — Rankin, Hill & Clark LLP

(57) ABSTRACT

An image processing apparatus is capable of judging a pass/fail for an inspection image which is an image of a job used for printing on a recording medium, by comparing the inspection image with an original image correlated with the inspection image and the image processing apparatus includes a hardware processor that judges a pass/fail for an image, wherein in accordance with a predetermined inspection mode set for the job, the hardware processor judges the inspection image to be abnormal when the inspection image and the original image match, and judges the inspection image to be nominal when the inspection image and the original image do not match.

29 Claims, 8 Drawing Sheets

(56) References Cited

U.S. PATENT DOCUMENTS

2019/0122351 A1\* 4/2019 Honma ................ G06F 3/1288

FOREIGN PATENT DOCUMENTS

| JP | 2015223835 | A2 | 12/2015 |
| JP | 2016035418 | A2 | 3/2016 |
| JP | 2016055525 | A2 | 4/2016 |
| JP | 2016061659 | A2 | 4/2016 |
| JP | 2017096835 | A2 | 6/2017 |

\* cited by examiner

IMAGE PROCESSING APPARATUS AND PROGRAM

The entire disclosure of Japanese patent Application No. 2017-220865, filed on Nov. 16, 2017, is incorporated herein by reference in its entirety.

BACKGROUND

Technological Field

The present invention relates to an image processing apparatus and a program capable of judging a pass/fail for an image by comparing an image of a job utilized as an inspection image with an original image.

Description of the Related art

In the field of image forming apparatuses such as copying machines, printers, and multifunctional peripherals, the pass/fail for images and image quality adjustment are judged using a reading result obtained by reading an image on a sheet. For example, a "waste detection process" for a job in a commercial printing market is a "process of finding an error when there is a difference between an actual print image and a correct image" in comparison with an image obtained by reading an image, in which a raster image processor (RIP) image or a proof image of the concerned job is utilized as the correct image. When the image is judged to he abnormal, the concerned sheet is determined as a waste sheet and, usually, a process such as stopping the output or discharging (purging) the waste sheet to a discharge destination different from that of a regular sheet is performed.

For example, JP 2017-96835 A, JP 2016-61659 A, JP 2016-55525 A, and JP 2016-35418 A have proposed techniques relating to image pass/fail judgment with respect to a reading result and have indicated the content that a case where the image of the reading result does not match the correct image is judged to be abnormal.

In addition, JP 2015-223835 A, JP 2015-174307 A, and JP 2014-155193 A have proposed techniques relating to recovery control after an abnormality is detected as a waste.

Incidentally, reprinting is sometimes carried out according to commercial printing specifications. As a workflow at the time of reprinting, in addition to checking perfect matches of color taste and the like with an original output matter, it is also necessary to check whether a changed portion from the original output matter fits the intention of a user. For this reason, there is a problem that time and workers are required for checking work at the time of reprinting.

SUMMARY

The present invention has been made in the context of the above situations and an object thereof is to provide an image processing apparatus and a program capable of facilitating a checking work at the time of reprinting and the like and reducing the cost required for such a checking work.

To achieve the abovementioned object, according to an aspect of the present invention, there is provided an image processing apparatus capable of judging a pass/fail for an inspection image which is an image of a job used for printing on a recording medium, by comparing the inspection image with an original image correlated with the inspection image, and the image processing apparatus reflecting one aspect of the present invention comprises a hardware processor that judges a pass/fail for an image, wherein in accordance with a predetermined inspection mode set for the job, the hardware processor judges the inspection image to be abnormal when the inspection image and the original image match, and judges the inspection image to be normal when the inspection image and the original image do not match.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
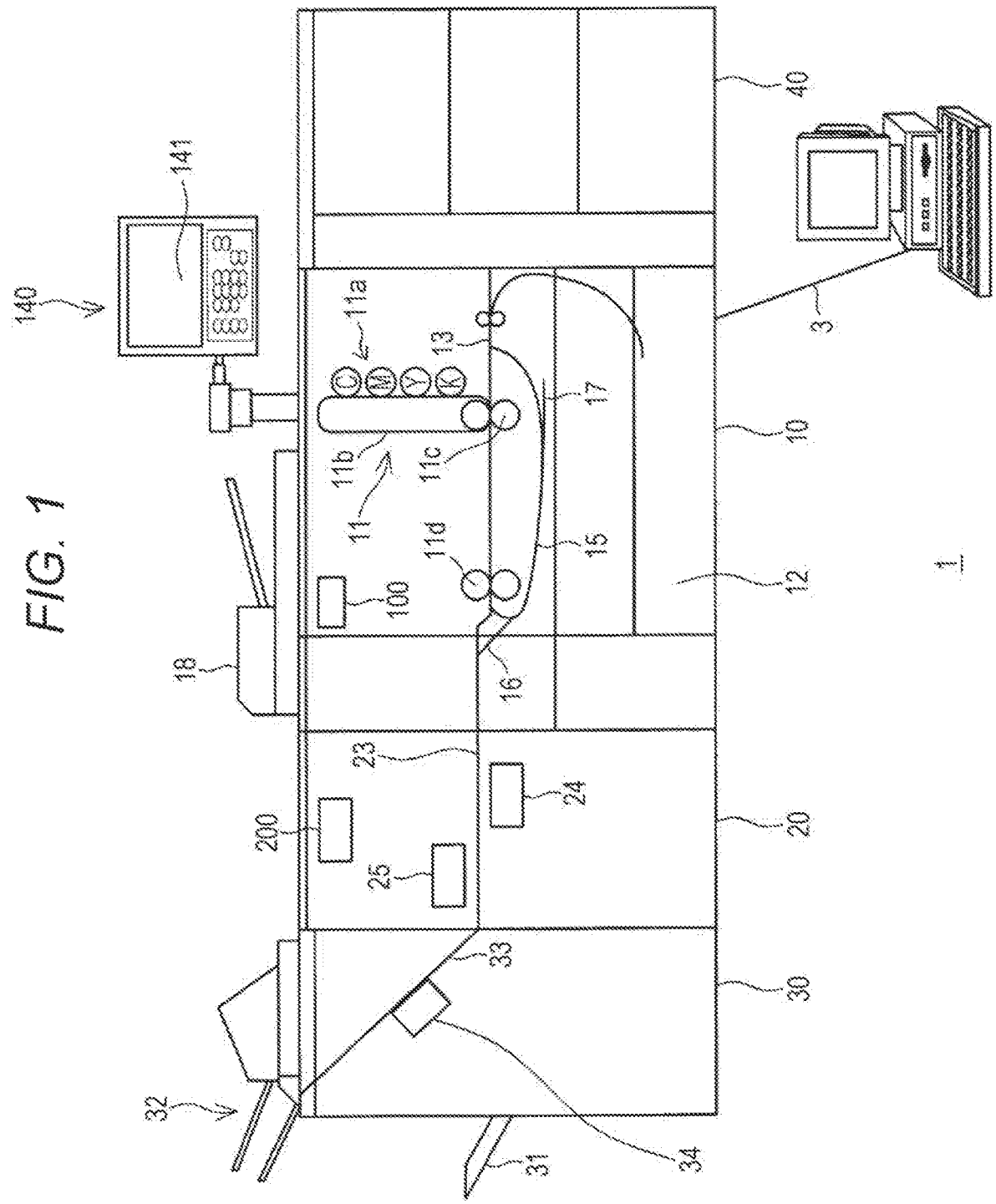
FIG. 1 is a diagram illustrating a mechanical outline of an embodiment of the present invention.

FIG. 1 is a schematic diagram illustrating an image forming apparatus 1 and an external device 4 connected to the image forming apparatus through a network. An image processing apparatus which is one embodiment of the present invention is included in the image forming apparatus 1.

As illustrated in FIG. 1, the image forming apparatus 1 is provided with a sheet feeding device 40, a device main body 10, a reading device 20, and a post-processing device 30 in this order from the upper stage side to the lower stage side. Each device and the device main body are electrically and mechanically connected and communication and sheet conveyance are possible between connections.

The sheet feeding device 40 is provided with a plurality of sheet feed stages and sheets are accommodated in each sheet feed stage. The sheets accommodated in the sheet feed stages can be supplied to the device main body 10 installed at the subsequent stage. The sheet corresponds to a recording medium according to the present invention. In the present invention, the material of the recording medium is not limited to paper and may be made of cloth, plastic, or the like.

In the device main body 10, a main body sheet feeder 12 provided with a plurality of sheet feed trays is arranged on a lower side in a casing. In the main body sheet feeder 12, sheets are accommodated in each sheet feed tray. The sheet corresponds to the recording medium according to the present invention. The material of the recording medium is not limited to paper and may be made of cloth or plastic.

A conveyance path 13 is prepared within the casing of the device main body 10 and the sheet supplied from the sheet feeding device 40 or the main body sheet feeder 12 is conveyed to a downstream side along the conveyance path 13.

An image former 11 that forms an image on the sheet is prepared near the middle of the conveyance path 13.

The image former 11 has photoconductors 11a for each color (cyan, magenta, yellow, and black) and a charger, a laser diode (LD), a developer, a cleaner, and the like (not illustrated) are provided around the photoconductors 11a. The image former 11 also has an intermediate transfer belt 11b at a position where the intermediate transfer belt 11b makes contact with the photoconductors 11a for each color. The intermediate transfer belt 11b makes contact with the sheet on the conveyance path 13 at a secondary transferer 11c prepared in the middle of the intermediate transfer belt 11b. In addition, a fixer 11d is provided at a position on the downstream side of the secondary transferer 11c on the conveyance path 13.

In the case of forming an image on the sheet, after the photoconductors 11a are uniformly charged by the charger, the photoconductors 11a are irradiated with a laser beam from the LD and latent images are formed on the photoconductors 11a. The latent images on the photoconductors 11a are developed by the developer to toner images, the toner images on the photoconductor 11a are transferred to the intermediate transfer belt 11b, and the image on the intermediate transfer belt 11b is transferred onto the sheet at the secondary transferer 11c. The image is fixed by the fixer 11d on the sheet conveyed along the conveyance path 13 after the image is formed thereon.

In this embodiment, the image former 11 has been described as forming a color image. However, in the present invention, the image former 11 may form an image in a single color such as monochrome.

In addition, a reverse conveyance path 15 branches off from the conveyance path 13 on the downstream side of the fixer 11d. A downstream conveyance path 16 branches off from the middle of the reverse conveyance path 15 and is connected to the conveyance path 13 on the downstream side of the branching location of the reverse conveyance path 15. A withdrawal conveyance path 17 branches off from the reverse conveyance path 15 on the downstream side of a location where the downstream conveyance path 16 branches off. A downstream end of the reverse conveyance path 15 joins the conveyance path 13 at a position on the upstream side of the image former 11. The conveyance path 13 is connected to a conveyance path. 23 of the reading, device 20 connected at the subsequent stage in a straight direction.

In the case of forming an image on one side of the sheet, the sheet after the image formation is continuously conveyed straight on the conveyance path 13 and conveyed to the conveyance path 23 of the reading device 20.

In the case of switching a face side of the sheet after the image formation, the sheet is conveyed to the reverse conveyance path 15 and further conveyed beyond the branch point of the downstream conveyance path 16; then, the sheet is conveyed in an opposite direction on the reverse conveyance path 15 so as to be conveyed to the downstream side of the conveyance path 13 through the downstream conveyance path 16.

In the case of forming an image on the back side of the sheet by reversing the sheet, the sheet is sent from the conveyance path 13 to the reverse conveyance path 15 to be sent to the withdrawal conveyance path 17; then, the leading and trailing sides of the sheet are interchanged and the sheet is sent to the downstream side of the reverse conveyance path 15 so as to be circulated to the conveyance path 13. Thereafter, the image former 11 forms an image on the back side of the sheet.

Furthermore, the device main body 10 is provided with an operation member 140 on a top portion of the casing. The operation member 140 has a liquid crystal display (LCD) 141 provided with a touch panel and a group of operation keys, such as a numeric keypad, so as to be able to display information and accept operation input. The operation member 140 corresponds to a display and also serves as an operation member.

In this embodiment, the operation member 140 is constituted by integrating the operation member and the display, but the operation member and the display may not be integrated. For example, the operation member may be constituted by a mouse, a tablet, a terminal, or the like. In addition, the LCD 141 may be movable.

An automatic document feeder (ADF) 18 is provided on a top portion of the casing of the device main body 10 at a place where the operation member 140 is not located. The automatic document feeder (ADF) 18 automatically feeds a document set on a document table and a document fed by the automatic document feeder (ADF) 18 is read by a scanner 130 illustrated in FIG. 2.

A document on a platen glass (not illustrated) can also be read.

In the scanner 130, it is also possible to set a printed matter output from the image forming apparatus 1 to perform reading. For example, it is possible to set a sheet output by the image forming apparatus 1 to perform reading such that an image formed on the sheet is read. In this case, the seamier 130 corresponds to an image reader.

Furthermore, the device main body 10 has an image controller 100. The image controller 100 controls the entire image forming apparatus 1 and can be constituted by a central processing unit (CPU), a program activated by the CPU, a memory, and the like. Note that the image controller 100 may be prepared outside the device main body.

The reading device 20 has the conveyance path 23 and the sheet introduced from the device main body 10 is conveyed along the conveyance path 23. The downstream side of the conveyance path 23 is connected to the post-processing device 30 at the subsequent stage.

An image reader 24 that reads an image on a lower surface of the sheet conveyed through the conveyance path 23 and an image reader 25 that reads an image on an upper surface of that sheet are provided near the middle of the conveyance path 23, where the image reader 24 is positioned on the upstream side of the image reader 25 in a sheet conveyance direction.

The image readers 24 and 25 can be constituted by a charge coupled device (CCD) sensor, a complementary metal oxide semiconductor (CMOS) sensor, or the like, and are capable of reading an image of the sheet conveyed through the conveyance path 23 over the entire direction intersecting with the conveyance direction. Reading results obtained by reading by the image readers 24 and 25 are transmitted to a reading controller 200 provided in the reading device 20. The reading controller 200 can be constituted by a CPU, a program activated by the CPU, a memory, and the like. Note that the reading controller 200 may he prepared outside the device main body.

In the above description, the two image readers read the images of the front and back surfaces of the sheet, but the images of the front and back surfaces of the sheet may be read by one image reader by preparing a reverse conveyance path ahead of and behind the image reader and reversely conveying the sheet.

The reading controller 200 can judge the pass/fail for the image by contrasting image data of the reading result utilized as an inspection image with an image to be compared. In this embodiment, the reading controller 200 corresponds to a controller according to the present invention.

In the judgment, the judgment can be made in accordance with an inspection mode. The inspection mode can have a first mode and a second mode. In the first mode, similarly to a usual waste judgment, a case where an inspection image and an image to be compared match is judged to be normal and a case where both of the images do not match is judged to be abnormal. In the second mode, a case where the inspection image and the image to be compared match is judged to be abnormal and a case where both of the images do not match is judged to be normal. Note that the mode may have only a mode corresponding to the second mode or may have a mode other than the first mode and the second mode.

The image to be compared with the inspection image may be retained in a storage of the reading device 20 or retained in a detachable storage or the like, or alternatively, the image data for comparison may be acquired from the image forming apparatus 1 to be used for judgment. In the image forming apparatus 1, for example, data may be transmitted by the image controller 100. The reading controller 200 can acquire the comparison image from the device main body 10 or the outside of the image forming apparatus.

As an image for comparison to be used for image comparison, an original image correlated with the inspection image is used. The original image is an image correlated with the inspection image and is output before a job including the inspection image and included in a job different from the job including the inspection image. The job including the inspection image is a job in which a change is intentionally made on a job including the original image and can be said to be a job for reprinting. For this reason, an intentional change has been made in part to the preceding job and content changes in part, such as modification of typo errors, revision of issue date, and revision of version number, are sometimes implemented.

The original image is saved in a storage or the like even after output of the job. Original image data is retained in the image forming apparatus 1 or retained in a separate storage from the image forming apparatus 1 and is read as necessary to be used for image comparison. Hereinafter, the image for comparison is referred to as the original image.

A RIP image or an image obtained by proof output can be used for the original image.

The reading controller 200 can execute or control various actions once the judgment is completed. As one of these actions, the reading controller 200 can control such that a preview of an image that has been read is displayed. If the reading device 20 has a display, it is possible to display a preview on this display. It is also possible to perform control such that a preview is displayed on the operation member 140 or an external display. The preview display can be controlled such that, when the inspection image and the original image do not match, a section where the images do not match is displayed by text or an image. A mismatch section may be displayed within a preview screen.

Furthermore, as the various actions described above, job output stop can be controlled. In this case, it is possible to control such that a stop request is made to the image controller and the output is then stopped.

In addition, a partition sheet may be discharged according to the image pass/fail judgment, for example, such that the normal sheet is discriminated from a waste sheet with ease. The reading controller 200 can control so as to discharge the partition sheet by requesting the image controller 100 that is feeding the sheet to feed the partition sheet. The partition sheet may be fed from the sheet feeding device 40 or the main body sheet feeder 12, or alternatively, in a case where an insertion sheet feeder (not illustrated) or the like is provided, the partition sheet may be fed from this insertion sheet feeder to be discharged.

Also, as the various actions described above, it is possible to replace the image. When the inspection image is to be used as the original image afterwards, the original image can be replaced with the inspection image. Replacement can be implemented by a storage in which the original image is retained. When data of an image is acquired from the outside, it is possible to make a command to send data of the inspection image to the outside and to replace the original image therewith.

Furthermore, the reading controller 200 may enable editing of a read image obtained by reading the inspection image. For editing, an operation display may be prepared in the reading device such that the image can be edited on this operation display, or control may be exercised such that editing is enabled at the operation member of the device main body 10 or an external operation member.

The reading controller 200 can also control the discharge of the sheet. For example, control can be exercised such that the regular sheet obtained by outputting a job and the waste sheet having an image abnormality are distinguished when discharged. The sheet discharge control may be performed directly by the reading controller 200, or the sheet discharge control may be requested to the image controller 100. A concerned sheet having an abnormality and a sheet that remains within the machine can be distinguished from the regular sheet when discharged as a purging process.

In response to image judgment, the image controller may, for example, stop the output of the job, output the partition sheet, or control sheet discharge according to an instruction from the reading controller. In this case, the reading controller 200 and the image controller 100 may cooperate to function as a controller.

In this embodiment, the reading controller 200 serves as a main component of the image processing apparatus according to one embodiment of the present invention. Besides, a communicator for acquiring an image for inspection and a storage that retains images and judgment results may be included in the configuration. The reading controller 200 also has a nonvolatile memory and can retain, in this nonvolatile memory, setting contents of the inspection mode, a threshold used in judging whether the images match or mismatch, and the like. A program executed by the CPU included in the reading controller 200 can also be retained in the nonvolatile memory. This program corresponds to a program according to the present invention.

In this embodiment, the pass/fail judgment by comparing the images is made by the reading controller 200, but the image controller 100 may acquire the reading result such that pass/fail for the image is judged by the image controller 100. In this case, the image controller 100 corresponds to the controller according to the present invention and the program executed by the image controller 100 corresponds to the program according to the present invention.

In a case where the above judgment is made by the image controller, various actions can be executed and controlled by the image controller after the judgment is completed. As in a case where the judgment is made by the reading controller 200, display control, stop control for job output, discharge control for the partition sheet, replacement control for the original image with the read image, edit control for the read image, discharge control for the sheet, and the like can be performed.

The post-processing device 30 is provided with a conveyance path 33 capable of conveying the sheet and conveys the sheet introduced from the reading device 20 to the downstream side. A post-processor 34 that performs a post-process on the sheet is provided in a central part of the conveyance path 33. The post-processor 34 can execute a predetermined post-process. For example, a stapling process and a punching process can be performed as the post-process and moreover, it is possible to perform a post-process including folding, such as inner triple folding, saddle stitching, Z-folding, gate folding, and quarter folding. The post-processor 34 may perform a plurality of post-processes.

The conveyance path 33 branches off halfway and is connected to a first sheet discharger 31 and a second sheet discharger 32. A sheet having passed through the post-processor 34 is discharged to the second sheet discharger 32 and a sheet on which the post-process has not been performed is discharged to the first sheet discharger 31. Note that a sheet on which the post-process has not been performed may be discharged to the second sheet discharger 32.

Furthermore, it is desirable that the regular sheet obtained by outputting a job be discharged to the second sheet discharger 32 and a sheet that has been judged to be abnormal by the image pass/fail judgment or a sheet on which the purging process is performed be distinguished from the regular sheet when discharged. For example, such sheets may be made distinguishable from the regular sheet by discharging the sheet to the first sheet discharger which is a sheet discharge destination different from that of the regular sheet or, if discharged to the second sheet discharger, by shifting the discharge position to discharge or rotating the sheet to discharge.

The sheet discharge control may be performed by the reading controller 200 that judges the pass/fail for the image, or alternatively, the sheet discharge control may be performed by the image controller 100 upon acceptance of an instruction from the reading controller 200. In addition, in a case where the pass/fail for the image is judged by the image controller 100, the image controller 100 can be adapted to control the sheet discharge.

In this embodiment, the image forming apparatus 1 is constituted by the sheet feeding device 40, the device main body 10, the reading device 20, and the post-processing device 30. However, in the present invention, the configuration of the image forming apparatus is not limited to the above configuration. For example, the image forming apparatus may be constituted by the device main body 10 and the reading device 20, or alternatively, the image forming apparatus may be constituted by only the device main body 10 such that the device main body 10 provided with the reading device 20, the post-processing device 30, the sheet feeding device 40, and the like is used as an image forming system.

Furthermore, although the image forming apparatus 1 is provided with the reading device 20, the reading device may be provided within the device main body, in which case the image forming apparatus and the reading device are not mechanically connected. The image processing apparatus of the present invention may have the image reader or may not have the image reader. Additionally, the image processing apparatus may be provided with the image former, or alternatively, an image processing apparatus not provided with the image former may be regarded as the image processing apparatus.

Figure 2:
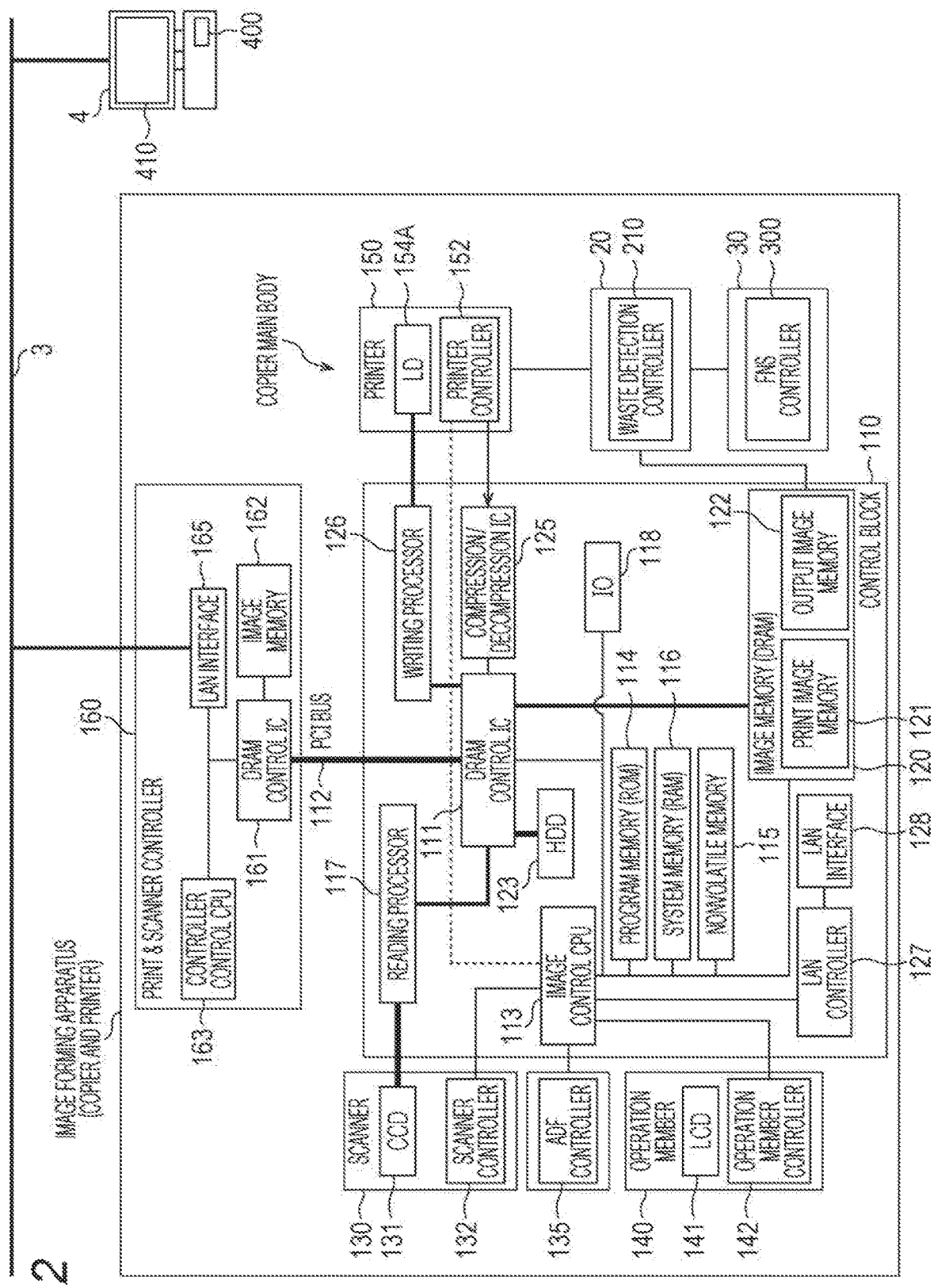
FIG. 2 is a diagram illustrating electric blocks of an embodiment of the present invention.

Next, an electrical configuration of the image forming apparatus 1 will be described with reference to FIG. 2.

The image forming apparatus 1 has a digital copier and a print & scanner controller 160 as its main components. The digital copier has a control block 110, the scanner 130, the operation member 140, and a printer 150. The print & scanner controller 160 processes image data input from and output to the external device 4 such as a terminal personal computer (PC).

The control block 110 has a peripheral component interconnect (PCI) bus 112 and a dynamic random access memory (DRAM) control integrated circuit (IC) 111 is connected to the PCI bus 112, while an image control CPU 113 is connected to the DRAM control IC 111. A hard disk drive (HDD) 123 is connected to the PCI bus 112 via the DRAM control IC 111.

A program memory (ROM) 114, a nonvolatile memory 115, and a system memory (RAM) 116 are connected to the image control CPU 113.

A program executed by the image control CPU 113, and the like are retained in the program memory (ROM) 114. The program may be retained in the nonvolatile memory 115 or the HDD 123. Additionally, the program and parameters may be retained in a portable removable storage medium. The system memory (RAM) 116 is used as a work area or the like when the program is executed.

Setting data such as machine setting information, a process control parameter, and the like are retained in the nonvolatile memory 115 and the HDD 123. A parameter for making judgment during the image pass/fail judgment, and the like are additionally retained therein. A method for the image pass/fail judgment is not particularly limited and a known method such as pattern matching can be used, in which case a threshold used in judging as a fail, and the like can be retained therein.

The image control CPU 113 is capable of grasping the entire state of the image forming apparatus 1 by executing the program and controlling the image forming apparatus 1 and can perform control of actions such as sheet conveyance and image formation, processes on image data for image formation, and the like.

The image control CPU 113 is capable of reading nonvolatile data from the nonvolatile memory 115 and also capable of writing desired data to the nonvolatile memory 115.

The image controller is constituted by the image control CPU 113, the program activated by the image control CPU 113, the program memory (ROM) 114, the system memory (RAM) 116, the nonvolatile memory 115, and the like. In a case where the pass/fail for the image is judged by the image controller, the image controller corresponds to the controller according to the present invention. The program executed by the image controller includes the program according to the present invention. The program may be retained in the HDD 123 or the like as well as the nonvolatile memory 115 or may be retained in a portable storage medium.

A scanner controller 132 of the scanner 130 is connected to the image control CPU 113 so as to enable serial communication.

The scanner 130 is provided with a CCD 131 and the scanner controller 132. The CCD 131 can optically read an image on the sheet. The scanner controller 132 controls the entire scanner 130 and controls reading of an image by the CCD 131, and the like. The scanner controller 132 is connected to the image control CPU 113 so as to enable serial communication and is under the control of the image control CPU 113. The scanner controller 132 can he constituted by a CPU, a program that activates the CPU, and the like.

Image data read by the CCD 131 is transmitted to a reading processor 117 via the DRAM control IC 111.

The reading processor 117 conducts various types of processes such as an analog signal process, an analog-to-digital (A/D) conversion process, and a shading process on an analog image signal input from the CCD 131 to generate digital image data and outputs the digital image data to a compression/decompression IC 125 via the DRAM control IC 111.

An ADF controller 135 is also controllably connected to the image control CPU 113 and the ADF controller 135 controls a flow-type automatic document feeder (ADF) 18.

The scanner 130 reads an image of a document placed on the platen glass on the top portion of the device main body 10 or an image of a document automatically conveyed by the flow-type automatic document feeder (ADF) 18 to obtain image data.

The operation member 140 is provided with the touch panel type LCD 141 and an operation member controller 142. Various types of information can be displayed and operations can be input on the LCD 141. Operations can also be input by operation keys and the like.

In the operation member 140, it is possible to input action control conditions such as settings and action commands for the device main body 10. Furthermore, for example, the operation member 140 can display setting contents, a machine state, a document image, and the like, display a preview of the read image, display a mismatch section at the time of image comparison, display a message, and edit the read image.

In the operation member 140, various types of settings can be made for the device main body 10, the reading device 20, the post-processing device 30, and the like by operation input through the LCD 141 and operation keys, and actions as to whether the image pass/fail judgment is to be carried out or the post-process is to be performed or the like can be set.

The operation member controller 142 controls the entire operation member 140. The operation member controller 142 is connected to the image control CPU 113 so as to enable serial communication and the operation member controller 142 controls the operation member 140 upon acceptance of a command from the image control CPU 113. The operation member controller 142 can be constituted by a CPU, a program that activates the CPU, and the like.

The compression/decompression IC 125 capable of compressing or decompressing image data is connected to the DRAM control IC 111. In accordance with an instruction from the image control CPU 113, the DRAM control IC 111 controls a compression process for image data and a decompression process for compressed image data by the compression/decompression IC 125 and also performs input/output control for image data with respect to an image memory (DRAM) 120.

The image memory (DRAM) 120 has a print image memory 121 and an output image memory 122. Image data that has been compressed is retained in the print image memory 121. When a job is output, image data extended on a page in an uncompressed state is temporarily retained in the output image memory 122. The image data in the output image memory 122 is transmitted to a writing processor 126.

Image data relating to a plurality of jobs can be saved in the image memory (DRAM) 120 under the control of the DRAM control IC 111 mentioned above. Job setting information, image data of a reserved job, and the like can be additionally saved in the image memory (DRAM) 120. These data can also be retained in the HDD 123.

A printer controller 152 of the printer 150 is also connected to the image control CPU 113. The printer controller 152 is constituted by a CPU, a storage, and the like and controls the entire printer 150 and an image forming action by an LD 154A upon acceptance of a command from the image control CPU 113. The LD 154A collectively refers to LDs for each color. In addition, the printer 150 can control the image former 11 and a conveyer including the conveyance path 23.

A local area network (LAN) controller 127 is additionally connected to the image control CPU 113 and a LAN interface 128 is connected to the LAN controller 127. A network 3 and other networks can he connected to the LAN interface 128 and data can be received from and transmitted to an external apparatus via the LAN interface 128.

The writing processor 126 is connected to the image former 11 provided with the LD 154A of the printer 150, and the like and generates write data to be used for the action of the LD 154A based on image data.

The printer 150 is constituted by the image former 11, the main body sheet feeder 12, the conveyance path 13 (including the reverse conveyance path 15), and the like.

The printer 150 is also provided with the printer controller 152 that controls the entire printer 150 (sheet feeding, image formation, sheet discharging, post-processes, and the like) and the printer controller 152 is connected to the aforementioned image control CPU 113 so as to enable serial communication. The printer controller 152 is activated in accordance with a control command from the image control CPU 113 to control the printer 150 and can perform sheet conveyance, image formation, output stop, sheet discharge control, and the like. The printer controller 152 can also instruct the compression/decompression IC 125 to decompress the compressed image data.

A waste detection controller 210 in the reading device 20 and an FNS controller 300 in the post-processing device (FNS) 30 are also connected to the printer controller 152. In this embodiment, the waste detection controller 210 is constituted by the reading controller 200. The waste detection controller may be provided in a component other than the reading controller 200. In this case, the waste detection controller corresponds to the controller according to the present invention.

The printer controller 152 can issue an instruction to the waste detection controller 210 and the FNS controller 300 based on a command from the image control CPU 113.

The waste detection controller 210 can judge the pass/fail for the image by comparing the read image with the original image according to an instruction from the image control CPU 113. The original image data may be retained in the storage of the reading device 20 or may be transmitted from the image control CPU 113 to the reading device 20.

A DRAM control IC 161 of the print & scanner controller 160 is also connected to the PCI bus 112.

In the print & scanner controller 160, an image memory 162 is connected to the DRAM control IC 161 and a controller control CPU 163 is connected to the DRAM control IC 161. A LAN interface 165 is additionally connected to the DRAM control IC 161. The LAN interface 165 is connected to the network 3.

An inputter/outputter (IO) 118 is additionally connected to the image control CPU 113. The IO 118 is activated as an interface that exchanges information between each component in the image forming apparatus 1 and the image control CPU 113.

For example, the image control CPU 113 can acquire the reading results of the image readers 24 and 25 of the reading device 20.

The external device 4 and the like are connected to the network 3. In the image forming apparatus 1, it is possible to transmit and receive data to and from the external device 4 and other image forming apparatuses through the network 3. The network 3 may be used as a wide area network (WAN), a telephone line, and the like besides a LAN and whether the network 3 is wireless or wired is not of concern.

The external device 4 has an external device controller 400 that controls the entire external device 4. The external device controller 400 can be constituted by a CPU, a program that activates the CPU, a storage, and the like. The external device 4 also has an external operation display 410 capable of displaying information.

The external device 4 can also be used as a terminal or a device that manages the image forming apparatus 1. In this case, the external device 4 is connected to the LAN interface 128 via the network 3. When the image forming apparatus 1 is managed by the external device 4, the external device controller 400 functions as a management controller that manages the image forming apparatus.

When the external device 4 is used as a terminal or a management device, a message can be displayed on the external operation display 410 and a preview can be displayed thereon by acquiring the read image obtained by reading an image. Additionally, for example, the read image can be edited on the external operation display 410 upon acceptance of an operation input.

When managing the image forming apparatus, the external device 4 may directly control the image forming apparatus or may instruct the image forming apparatus on control contents such that the controller of the image forming apparatus exercises control according to these instruction contents.

The external device 4 may judge the pass/fail for the image in accordance with the inspection mode by comparing the read image obtained by reading the image of the recording medium with the original image. In such an embodiment, the external device 4 can be used as the image processing apparatus according to the present invention and the external device controller 400 functions as the controller according to the present invention. In this case, a program activated by the external device controller 400 corresponds to the program according to the present invention.

At the time of the judgment described above, the external operation display 410 may be used to perform displays or operations such as preview display, message display, and editing of the read image, or may exercise control such that these displays and operation screens are implemented on an operation display outside the external device 4.

In response to image judgment, the image controller may stop the output of the job, output the partition sheet, or control discharging according to an instruction from the external device. In this case, the external device controller 400 and the image controller 100 may cooperate to function as a controller.

In addition, the external device 4 may simply, for example, display a preview, display a message, and edit the read image in accordance with the image judgment result of the image forming apparatus 1 or the like without judging the pass/fail for the image and such display and control can be performed under the control of the controller of the present invention. For example, when the read image is edited by the external device 4, the image controller 100 can acquire the data of the edited image. In addition, the original image may be provided in the image forming apparatus 1 or may be retained in a storage of the external device or another device. In the case of replacing the image with the inspection image, when a device provided with the controller of the present invention has no storage, the controller can command rewriting of the image to a device having a storage in which the image is retained.

Next, the basic action of the image forming apparatus 1 will be described.

First, a procedure of accumulating image data, in the image forming apparatus 1 will be described.

When the scanner 130 reads the image of a document to generate image data, the document is put on the scanner 130 and the image of the document is optically read by the CCD 131. In this case, the scanner controller 132 that has accepted a command from the image control CPU 113 controls the action of the CCD 131.

The image read by the CCD 131 is sent to the reading processor 117 and the reading processor 117 performs a predetermined data process. The image data on which the data process has been performed is sent out to the compression/decompression IC 125 to be compressed by a predetermined method in the compression/decompression IC 125 and retained in the image memory (DRAM) 120 or the HDD 123 via the DRAM control IC 111.

The image data retained in the image memory (DRAM) 120 or the HDD 123 can be managed as a job by the image control CPU 113. When image data is managed as a job, printing conditions are retained in association with the image data, in the image memory (DRAM) 120 and the HDD 123.

The print image data and the printing conditions may be separately retained in different storage media as long as the both are associated with each other. The printing conditions may be set by the user through the operation member 140 or may be automatically set depending on initial settings or an action status.

On the other hand, when the image data is acquired from the outside, for example, when the image data is acquired from the external device 4 or another image forming apparatus or the like through the network 3, the image data is received via the LAN interface 165 of the print & scanner controller 160. The received image data is retained in the image memory 162 via the LAN interface 165 and the DRAM control IC 161 according to the action of the controller control CPU 163.

Thereafter, the image data retained in the image memory 162 is provisionally retained in the output image memory 122 via the DRAM control IC 161, the PCI bus 112, and the DRAM control IC 111.

When the image data is page description data, the image data can be transformed into a raster image by a RIP process performed on the image data by the controller control CPU 163.

Print data retained in the output image memory 122 is sequentially sent to the compression/decompression IC 125 via the DRAM control IC 111 to be subjected to the compression process and retained in the print image memory 121 via the DRAM control IC 111. In addition, in the case of retaining in the HDD 123, the print data is retained in the HDD 123 via the DRAM control IC 111. These pieces of print data are managed by the image control CPU 113 in the same manner as described above. The image memory (DRAM) 120 and the HDD 123 serve as storages in which image data is saved.

When an image is output by the image forming apparatus 1, that is, when the image forming apparatus is used as a copying machine or a printer, image data retained in the print image memory 121, the nonvolatile memory 115, the HDD 123, and the like are sent out to the compression/decompression IC 125 via the DRAM control IC 111 and the image data is decompressed. The decompressed image data is sent out to the writing processor 126 via the DRAM control IC 111 so as to be repeatedly extended for the LD 154A by the writing processor 126 in accordance with the set printing conditions and the LD 154A writes the extended image data to each photoconductor based on the image data. The images written on the photoconductors thereafter undergo development, transfer, fixing, and the like and then are fixed on the sheet.

When the image forming apparatus 1 is used as a copying machine, information such as printing conditions (print mode) set on the operation member 140 is notified to the image control CPU 113 such that the image control CPU 113 creates setting information. The created setting information can be retained in a RAM in the image control CPU 113.

When the image forming apparatus 1 is used as a printer, the printing conditions can be set with a printer driver in the external device 4. As in the case of the image, the printing conditions set here are transferred to the external device 4, the LAN IF 165, the image memory 162, the DRAM control IC 161 (controller), the DRAM control IC 111 (main body), and the output image memory 122 in this order and retained in the output image memory 122.

Figure 3:
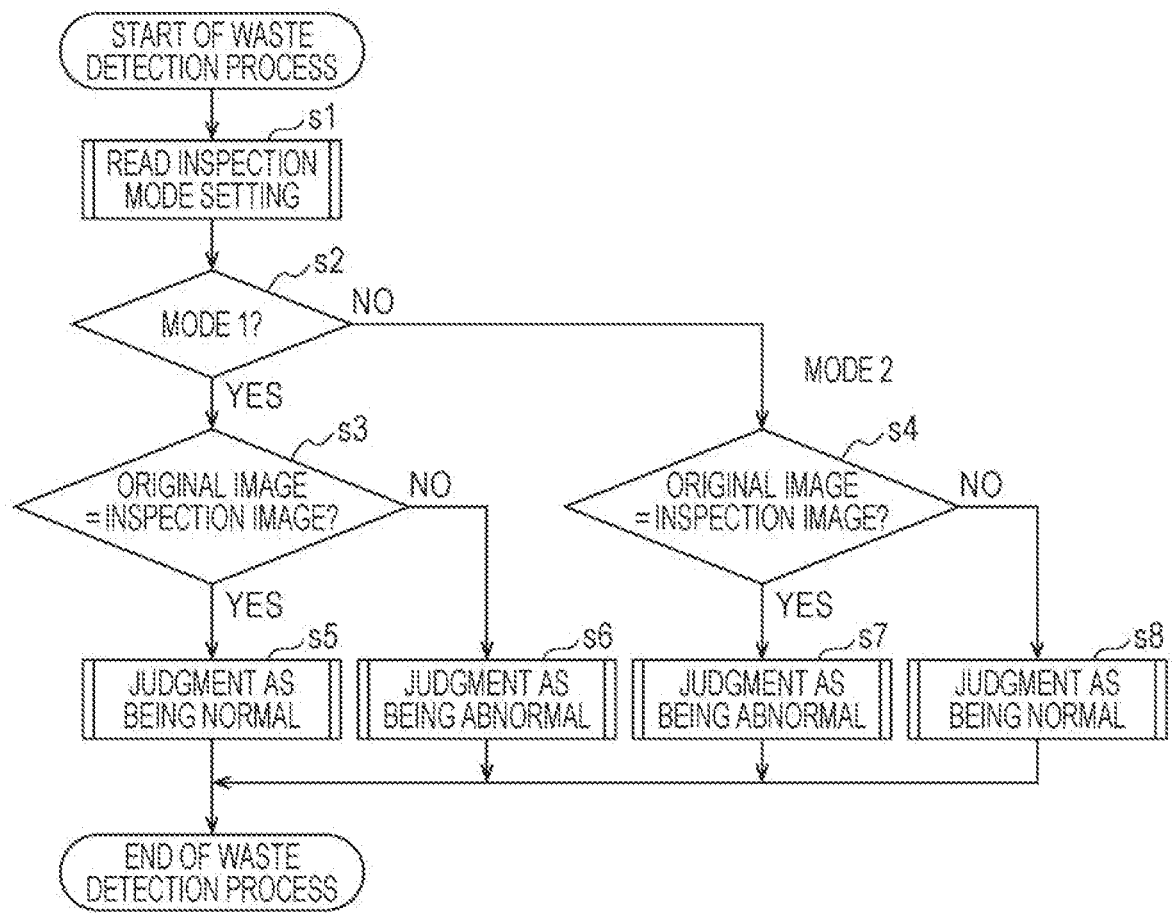
FIG. 3 is a flowchart for explaining a procedure judging normality and abnormality in accordance with an inspection mode when a waste detection process is started according to an embodiment of the present invention.

Next, a procedure of reading an image by the reading device 20 while the job is being output and judging the pass/fail for the image in accordance with the inspection mode by contrast with the original image will be described with reference to a flowchart in FIG. 3. The following procedure is executed under the control of the controller.

Note that the following procedure assumes that the inspection mode used in judging the pass/fail for the image is set in advance. The inspection mode may be set as a machine setting or may be set in correlation with a job. Furthermore, the inspection mode may be set in units of at least one of a sheet unit, a page printing surface on which the inspection image is printed, or a predetermined region of a page on which the inspection image is printed.

Note that the first mode and the second mode are used as the inspection mode. As in usual waste judgment for finding stain on the image, printing failure, and the like, the first mode is a mode in which a case where the output image utilized as an inspection image matches the original image is determined to be normal and a case where there is inconsistency between both of the images is judged to be abnormal because there is stain or the like. The second mode is based on the premise that the output inspection image is, for example, intentionally changed with respect to the original image and is a mode in which a case where the inspection image and the original image match is judged to be abnormal and a case where the inspection image arid the original image do not match is judged to be normal.

In this embodiment where judgment is made by the reading controller, when the original image data is not retained in the reading device, the original image can be used for judgment by sending the original image data from the device main body 10 or a storage on a server or the like to the reading device 20.

Once a waste detection process is started, the setting of the inspection mode is read (step s1).

Based on the read setting, it is judged whether the inspection mode is the first mode (step s2). Hereinafter, the first mode will be described as mode 1.

When the inspection mode is mode 1 (Y in step s2), it is judged whether the original image and the inspection image which is the read image match (step s3). If the original image and the inspection image match (Y in step s3), the inspection image is judged to be normal (step s5) and thereafter the process is terminated. If the original image and the inspection image do not match (N in step s3), the inspection image is judged to be abnormal (step s6) and thereafter the process is terminated.

When the inspection mode is not mode 1 in step s2 (N in step s2), it is determined that the mode is the second mode and the process proceeds to step s4. Hereinafter, the second mode will be described as mode 2.

In step s4, it is judged whether the original image and the inspection image match (step s4). If the original image and the inspection image match (Y in step s4), the inspection image is judged to he abnormal (step s7) and thereafter the process is terminated. If the original image and the inspection image do not match (N in step s4), the inspection image is judged to be normal (step s8) and thereafter the process is terminated.

In this procedure, it is determined that the inspection image is normal because the inspection image does not match the original image in mode 2 and it can be seen that an intentional change has been made. On the other hand, if the images match, an intentional change is not reflected and the inspection image is determined to be abnormal.

When the number of images does not match in comparison between the original image and the inspection image, inspection may be executed on only a predetermined page, or control may be performed such that error stop is enabled.

Next, a setting procedure for the inspection mode will be described with reference to a flowchart in FIG. 4. The following procedure is executed under the control of the controller. Setting units are distinguished from each other by adding parenthesized numbers.

The setting content may be defined by the machine setting or may be set by a job ticket or the like.

Once an inspection mode setting process is started, firstly, it is judged whether the setting unit is a job (step s10). When the setting unit is a job (Y in step s10), the inspection mode setting is reflected in job data (step s11, parenthesized number 1) and thereafter the process is terminated.

When the setting unit is not a job (N in step s10), it is judged whether the setting unit is a sheet unit (step s12).

When the setting unit is a sheet unit (Y in step s12), the inspection mode setting is reflected in page data by the number of pages belonging to the target sheet (step s13, parenthesized number 2). The setting is made by the sheet unit such as the front and back sides or N-in-1. Thereafter, the process is terminated.

When the setting unit is not a sheet unit (N in step s12), it is judged whether the setting unit is a page unit (step s14). When the setting unit is a page unit (Y in step s14), the inspection mode setting is reflected in page data (step s15, parenthesized number 3) and thereafter the process is terminated.

When the setting unit is not a page unit (N in step s14), it is judged whether the setting unit is a predetermined region (step s16).

When the setting unit is a predetermined region (Y in step s16), the inspection mode setting is reflected in coordinate variables of the page data according to the predetermined region (step s17, parenthesized number 4) and the process is terminated. The range of the predetermined region may not be set by coordinate variables.

When the setting unit is not a predetermined region (N in step s16), the process is terminated.

Figure 5:
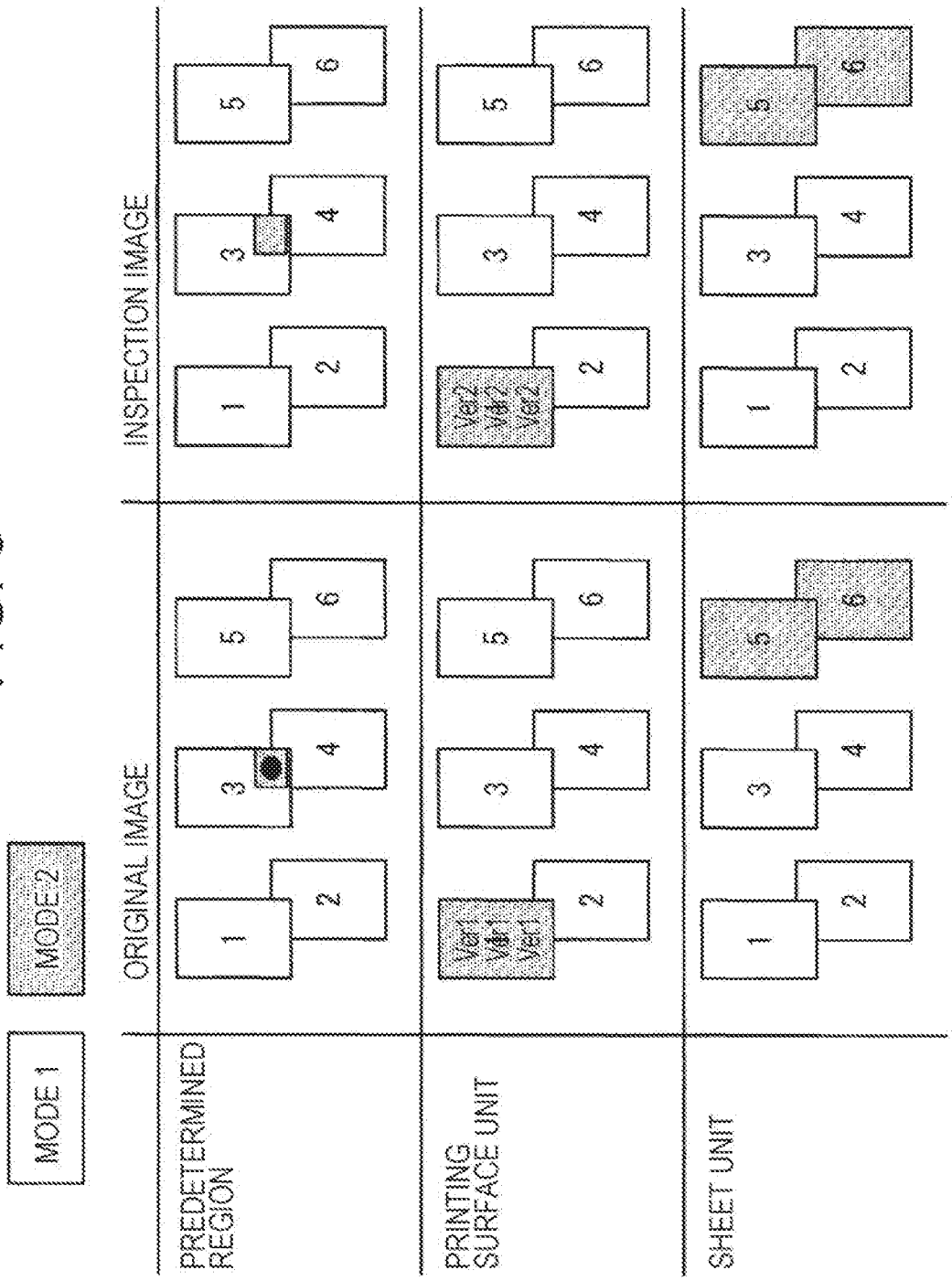
FIG. 5 is a diagram for explaining the variety in setting units in the waste detection process according to an embodiment of the present invention.

FIG. 5 is a schematic diagram for explaining the setting unit in the inspection mode.

The setting unit can be set for both of modes 1 and 2. The setting unit may be set only for mode 2.

In the explanation contents illustrated in the upper part of FIG. 5, a region of the original image in the predetermined region and a region of the inspection image in the same predetermined region are assigned as a setting unit and the predetermined regions are displayed by shading. At the time of judgment, the judgment is made on images of these regions, for example, in mode 2. In other regions, inspection may not be performed or inspection may be performed in another mode. That is, when mode 2 is set, the judgment may be made in mode 1 for other regions.

In the explanation contents illustrated in the middle part of FIG. 5, a region of the original image in units of printing surface and a region of the inspection image in units of printing surface in the same manner are assigned as a setting unit and the printing surfaces are displayed by shading. In FIG. 5, the first page is designated as a setting unit. At the time of judgment, the judgment is made on this printing surface unit, for example, in mode 2. For other printing surfaces, inspection may not be performed or judgment may be made in another mode. For example, when mode 2 is set on the basis of the setting unit, inspection may be performed in mode 1 for other printing surfaces. Other printing surfaces include other printing surfaces in duplex printing.

In the explanation contents illustrated in the lower part of FIG. 5, a region of the original image in units of sheet and a region of the inspection image in units of sheet in the same manner are assigned as a setting unit and the setting unit is displayed by shading on a sheet unit basis. In FIG. 5, a sheet of the fifth and sixth pages which are to be printed in duplex printing is targeted. In addition to this, N-in-1 and the like can be cited as the sheet unit. At the time of judgment, the judgment is made on the sheet unit, for example, in mode 2. For other sheets, inspection may not be performed or judgment may be made in another mode. For example, when mode 2 is set on the basis of the setting unit, inspection may be performed in mode 1 for other printing surfaces.

A method of setting the above setting units by job tickets will be described with reference to a conceptual diagram of the job tickets in FIG. 6.

Figure 6:
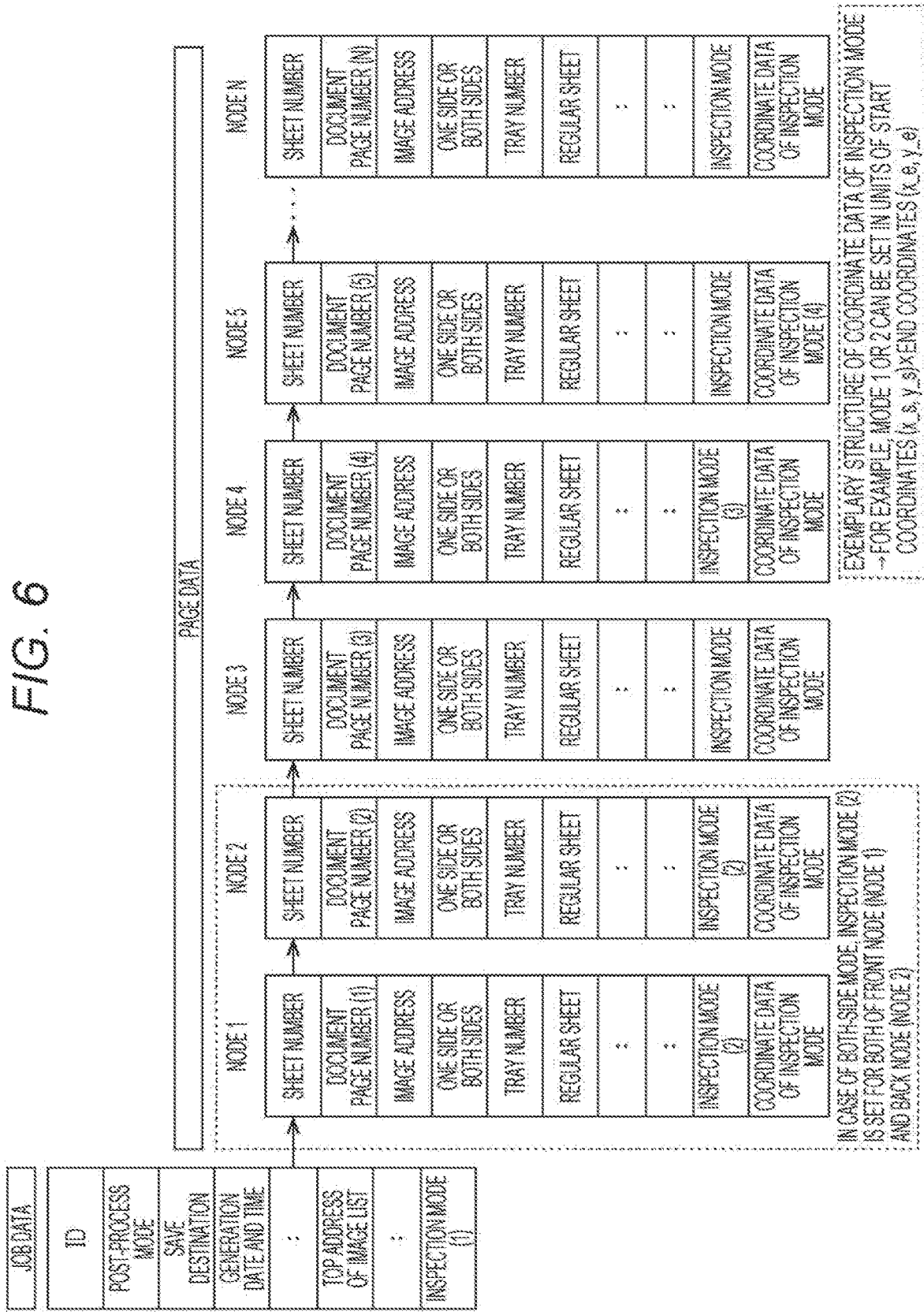
FIG. 6 is a diagram for explaining an example in which a setting unit in the waste detection process is set by job tickets according to an embodiment of the present invention.

In the job tickets, a ticket of job data illustrated on the left end side of FIG. 6 and tickets of page data for each page illustrated on the right side of the ticket of job data are illustrated and items of the inspection mode are included in the setting items of the tickets.

Figure 4:
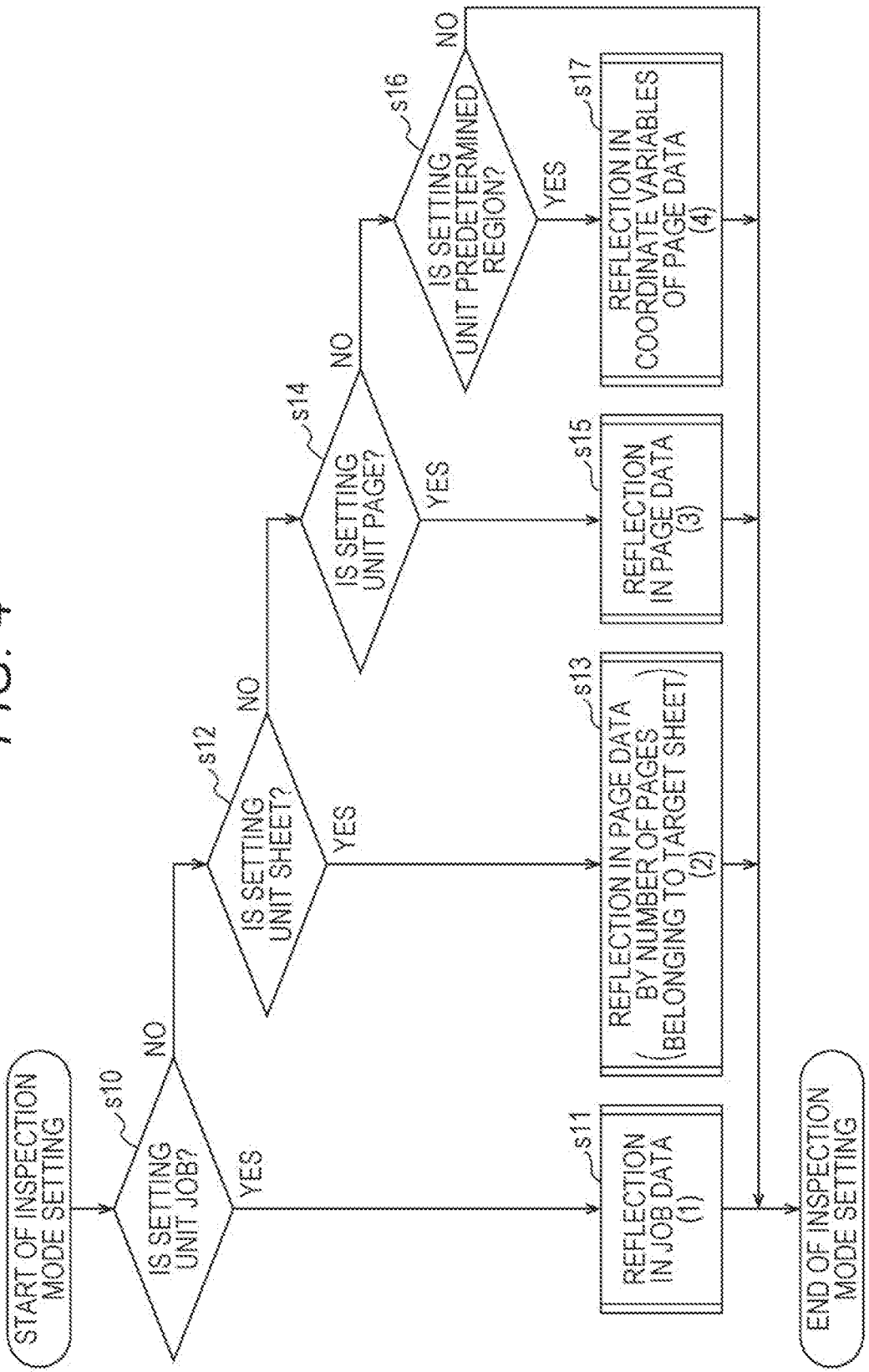
FIG. 4 is a flowchart for explaining a procedure judging normality and abnormality based on a setting unit in accordance with the inspection mode when the waste detection process is started according to an embodiment of the present invention.

In FIG. 6, the setting units are illustrated by the same parenthesized numbers as those in FIG. 4 in correspondence to the contents of the setting unit illustrated in FIG. 4.

When the job data is assigned as a setting unit, parenthesized number 1 is illustrated in the column of the inspection item of the job data, indicating an example of setting in units of jobs.

In node 1 and node 2, parenthesized number 2 which employs the sheet unit is illustrated. Note that, in the case of a setting to perform duplex printing for node I and node 2, parenthesized number 2 of the inspection mode is set for both of the front node (node 1) and the back node (node 2).

In node 3 and node N, the unit for the inspection item is not set.

In node 4, parenthesized number 3 is set in the inspection item and the page unit is assigned as the setting unit for inspection.

In node 5, parenthesized number 4 is set for the inspection mode and the predetermined region is assigned as the setting unit for inspection. This setting can be expressed, for example, as a coordinate structure and mode 1 or 2 can be set in units of, for example, start coordinates $(x\_s, y\_s)\times$end coordinates $(x\_e, y\_e)$. In the job tickets, easy setting may he enabled by setting the selling unit for the ticket of the entire job and selling different units for page data desired to be set differently in other tickets.

Figure 7:
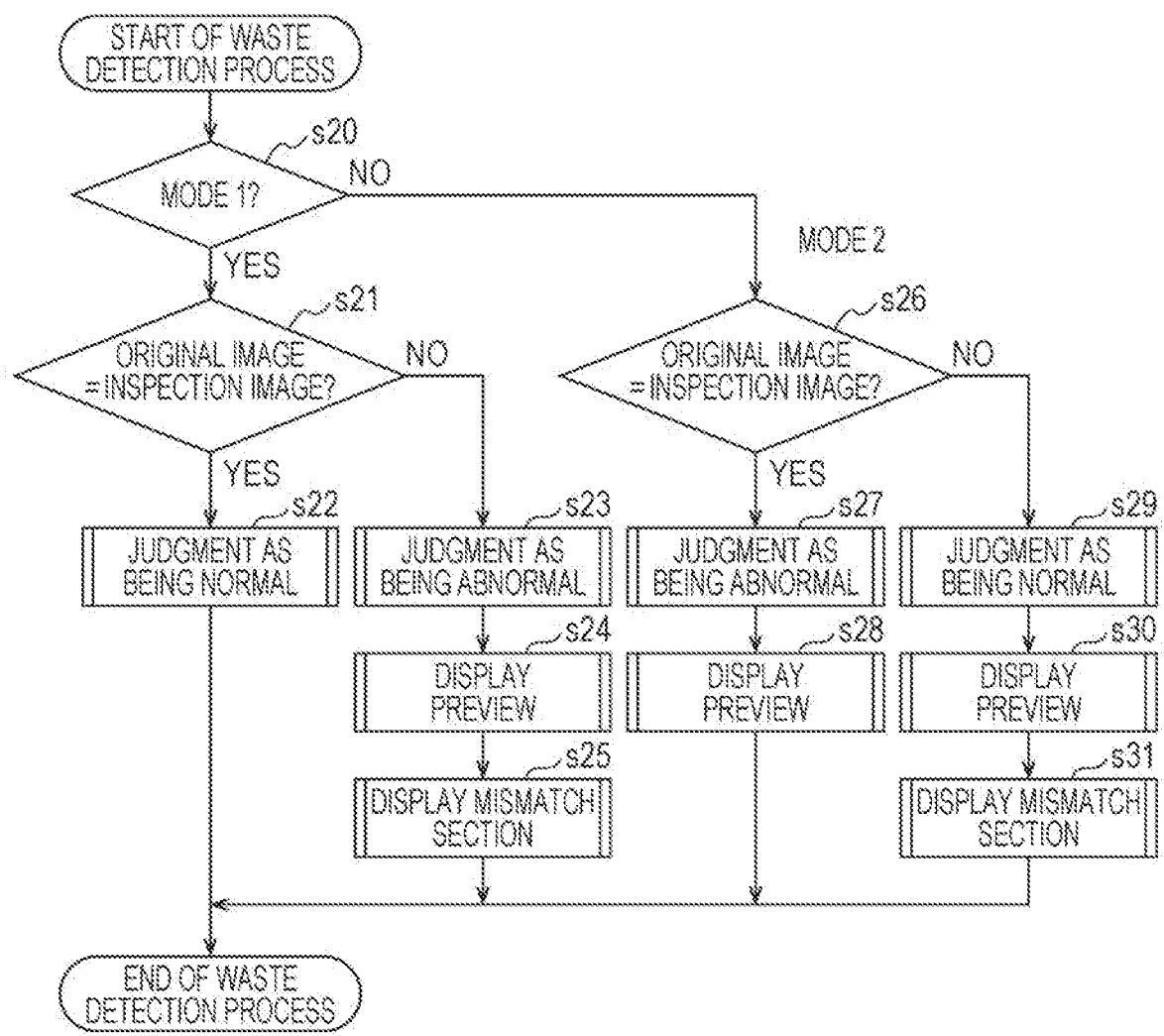
FIG. 7 is a flowchart for explaining, a procedure of displaying a preview as a predetermined action assumed to be performed when image judgment is completed in the waste detection process according to an embodiment of the present invention.

Next, an example of displaying a preview assuming that a predetermined action is performed when image judgment is completed will be described with reference to a flowchart in FIG. 7. The following procedure is executed under the control of the controller.

Once the waste detection process is started, it is judged whether the inspection mode is mode 1 (step s20). When the inspection mode is mode 1 (Y in step s20), it is judged whether the original image and the inspection image match (step s21). When the original image and the inspection image match (Y in step s21), the inspection image is judged to he normal (step s22) and the process is terminated. When the original image and the inspection image do not match (N in step s21), the inspection image is judged to be abnormal (step s23) and a preview of the inspection image is displayed (step s24). Furthermore, a mismatch section is displayed as text or an image within the preview screen (step s25) and the process is terminated. The mismatch section may be displayed outside the preview screen. During the display of the mismatch section, the display may be canceled according to an operation of the user, or the like such that the process is terminated.

When the inspection mode is not mode 1 in step s20 (N in step s20), mode 2 is turned on in this example and it is judged whether the original image and the inspection image match (step s26). When the original image and the inspection image match (N in step s26), the inspection image is judged to be abnormal (step s27) and a preview is displayed (step s28); thereafter, the process is terminated. During the preview display, the display may be canceled according to an operation of the user, or the like such that the process is terminated.

When the original image and the inspection image do not match in step s26 (N in step s26), the inspection image is judged to be normal (step s29) and a preview is displayed (step s30). Furthermore, a mismatch section is displayed as text or an image within the preview screen (step s31) and the process is terminated. The mismatch section may be displayed outside the preview screen. After the mismatch section is displayed, the process is terminated. However, the display may be canceled according to an operation of the user, and the like such that the process is terminated. In mode 2, the preview is displayed in both of a case where the image is judged to be normal and a case where the image is judged to be abnormal, whereas in the mode 1, the preview is displayed only in a case where the image is judged to be abnormal.

In the above explanation, a case where a preview is displayed as a predetermined action has been described as an example. As another predetermined action, however, a sheet for partitioning may be output, a job output may be stopped, or a message may be displayed. These actions may be activated in combination.

When the sheet for partitioning is output, in the case of mode 1, the sheet may be output only at the time of judgment as being abnormal and, in the case of mode 2, the sheet may be output both at the time of judgment as being normal and at the time of judgment as being abnormal.

In addition, when the output is stopped, in the case of mode 1, the output can be stopped only at the time of judgment as being abnormal and, in the case of mode 2, the output can be stopped both at the time of judgment as being normal and at the time of judgment as being abnormal.

Furthermore, when a message is displayed, in the case of mode 1, a message may be displayed only at the time of judgment as being abnormal and, in the case of mode 2, a message may be displayed both at the time of judgment as being normal and at the time of judgment as being abnormal.

When the image is judged, in a case where a job is to print a plurality of copies, it is presumed that the waste judgment in mode 2 has already been completed. Accordingly, in a case where mode 2 is set, a waste finding may be performed by switching the mode to mode 1.

Figure 8:
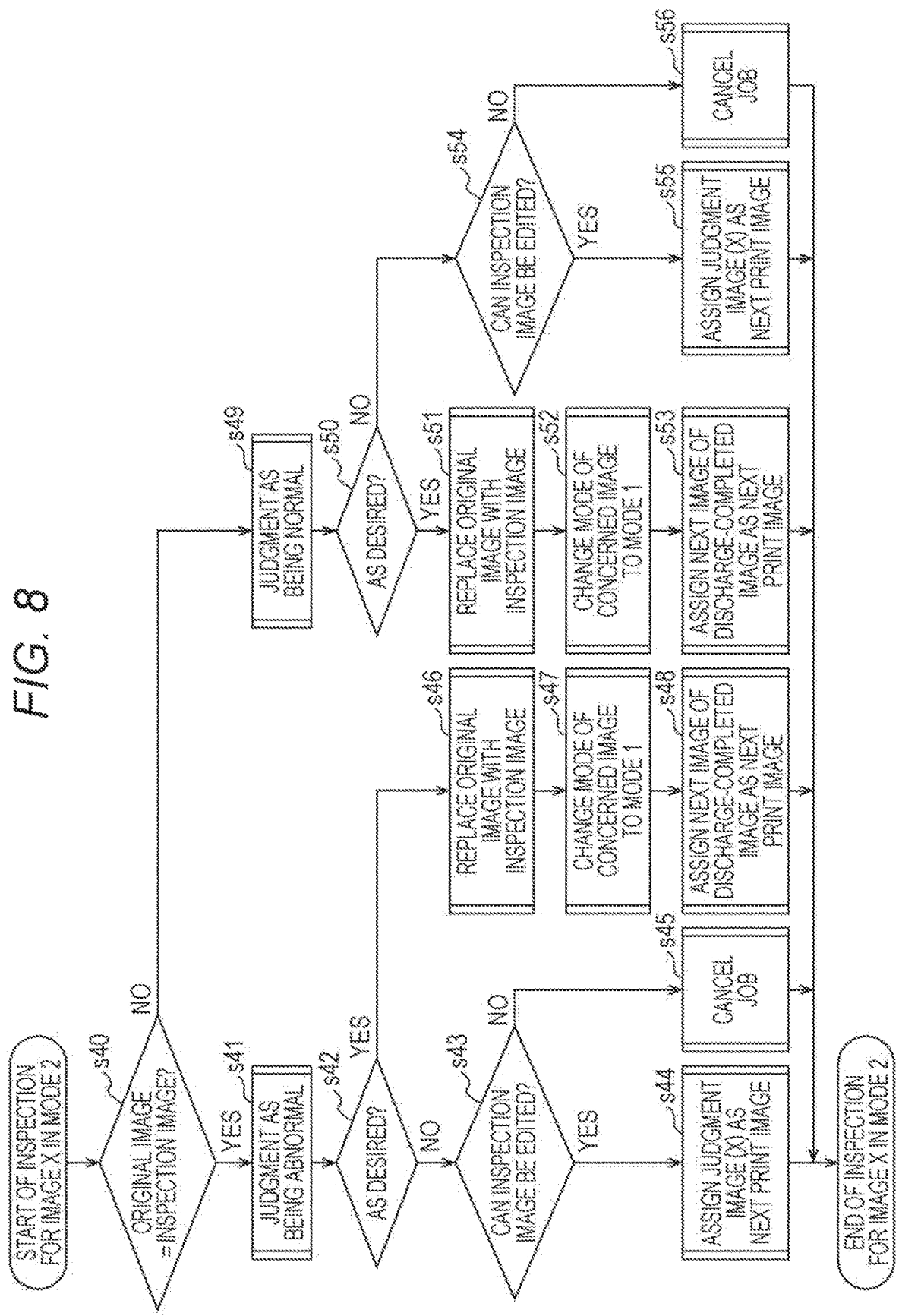
FIG. 8 is a flowchart for explaining a procedure of enabling instruction of user determination with respect to image judgment in mode 2 in the waste detection process according to an embodiment of the present invention.

Next, an example of enabling instruction of user determination with respect to image judgment in mode 2 will be described with reference to a flowchart in FIG. 8. The following procedure is executed under the control of the controller.

Once the inspection is started, it is judged whether the original image matches the inspection image (step s40).

When the original image and the inspection image match (Y in step s40), the inspection image is judged to be abnormal (step s41) and it is judged whether the inspection image is as the user desires (step s42). Whether the inspection image is as desired can be judged, for example, by inquiring the user by the operation member or the like and accepting the result of the operation such as OK or No performed by the user in addition, as a variation, if there is no operation indicating that the inspection image is not as desired for a certain period of time since the inquiry was made, the operation may be advanced assuming that the inspection image is as desired. When the inquiry is made to the user, for example, a preview of the inspection image may be displayed such that the user can easily confirm the inspection image.

Whether the operation indicates that the inspection image is as desired is judged by an operation based on the user's determination, and the like and, when the inspection image is not as desired (N in step s42), it is judged whether the inspection image can be edited (step s43). If the inspection image can be edited (Y in step s43), a judgment image edited based on the inspection image is assigned as a next print image (step s44) and the process is terminated. When the inspection image cannot be edited (N in step s43), the output of the job is cancelled (step s45) and the process is terminated.

Meanwhile, when the inspection image is as desired in step s42 (Y in step s42), it is presumed that the mode is wrongly set. Accordingly, the original image is replaced with the inspection image (step s46) and the mode of the concerned image is changed to mode 1 (step s47). Subsequently, the next image of a discharge-completed image is assigned as a next print image (step s48) and the process is terminated.

When the original image and the inspection image do not match in step s40 (N in step s40), the inspection image is judged to be normal (step s49) and it is judged whether the inspection image is as desired (step s50). Whether the inspection image is as desired can be determined in the same manner as in step 42.

When the inspection image is as desired (Y in step s50), the original image is replaced with the inspection image (step s51) and the mode of the concerned image is changed to mode 1 (step s52). Subsequently, the next image of a discharge-completed image is assigned as a next print image (step s53) and the process is terminated.

When the inspection image is not as desired in step s50 (N in step s50), it is judged whether the inspection image can be edited (step s54). If the inspection image can be edited (Y in step s54), a judgment image edited based on the inspection image is assigned as a next print image (step s55) and the process is terminated. When the inspection image cannot be edited (N in step s54), the output of the job is cancelled (step s56) and the process is terminated.

The present embodiment has proposed a procedure of judging an intentionally changed portion to be normal, thereby obtaining, an effect in being able to simplify and automate an inspection flow in a case where "intentionally changed portion from the original is deemed as a changed point (correction of typo errors and the like)" at the time of reprinting and the like.

The above embodiment has described that the image is read and judged while the job is being output. However, the image may be read by the reading device to judge the pass/fail for the image, irrespective of the output of the job. In that case, the reading device may be mechanically offline from the device main body but electrically connected to the device main body. Furthermore, the reading device may be mechanically and electrically offline therefrom. In this case, the original image data and the reading result may be moved to another device by a movable storage or the like.

In addition, the above embodiment has described the image judgment using both of modes 1 and 2. However, the present invention can also be applied to a case where the image is judged using only mode 2.

Although embodiments of the present invention have been described and illustrated in detail, the disclosed embodiments are made for purposes of illustration and example only and not limitation. The scope of the present invention should he interpreted by terms of the appended claims. Any modifications can be made to the embodiments of the present invention as appropriate without departing from the scope of the present invention.

What is claimed is:

1. An image processing apparatus capable of judging a pass/fail for an inspection image which is an image of a job used for printing on a recording medium, by comparing the inspection image with an original image correlated with the inspection image, the image processing apparatus comprising a hardware processor that judges a pass/fail for an image, wherein in accordance with a predetermined inspection mode set for the job, the hardware processor judges the inspection image to be abnormal when the inspection image and the original image match, and judges the inspection image to be normal when the inspection image and the original image do not match.

2. The image processing apparatus according to claim 1, wherein, in a case where the predetermined inspection mode is assigned as a second mode and another inspection mode set for the job is assigned as a first mode, in accordance with the first mode, the hardware processor judges the inspection image to be normal when the inspection image and the original image match, and judges the inspection image to be abnormal when the inspection image and the original image do not match.

3. The image processing apparatus according to claim 1, wherein the hardware processor carries out a predetermined action when the judgment is completed.

4. The image processing apparatus according to claim 3, wherein the hardware processor controls at least to display a preview of an inspection image as the predetermined action.

5. The image processing apparatus according to claim 4, wherein the hardware processor indicates a mismatch section when a judgment result represents mismatching.

6. The image processing apparatus according to claim 3, wherein the hardware processor performs control to output a job having an inspection image and also performs control to stop output of a job as the predetermined action while making the judgment.

7. The image processing apparatus according to claim 3, wherein the hardware processor performs control to display a message as the predetermined action.

8. The image processing apparatus according to claim 3, wherein the hardware processor performs control to output a job having an inspection image and also performs control to output a recording medium for partitioning as the predetermined action while making the judgment.

9. The image processing apparatus according to claim 2, wherein the hardware processor controls at least to display a preview of an inspection image when the judgment is completed and, in displaying the preview, displays the preview selectively at the time of judgment as being abnormal in the case of the first mode and displays the preview both at the time of judgment as being normal and at the time of judgment as being abnormal in the case of the second mode.

10. The image processing apparatus according to claim 2, wherein the hardware processor performs control to output a job having an inspection image and also, while making the judgment, when the judgment is completed, stops output selectively at the time of judgment as being abnormal in the case of the first mode and stops output both at the time of judgment as being normal and at the time of judgment as being abnormal in the case of the second mode.

11. The image processing apparatus according to claim 2, wherein the hardware processor performs control to display a message when the judgment is completed and, in displaying the message, displays the message selectively at the time of judgment as being abnormal in the case of the first mode and displays the message both at the time of judgment as being normal and at the time of judgment as being abnormal in the case of the second mode.

12. The image processing apparatus according to claim 2, wherein the hardware processor performs control to output a job having an inspection image and also performs control to output a recording medium for partitioning when the judgment is completed while making the judgment and, in outputting the recording medium for partitioning, outputs the recording medium for partitioning selectively at the time of judgment as being abnormal in the case of the first mode and outputs the recording medium for partitioning both at the time of judgment as being normal and at the time of judgment as being abnormal in the case of the second mode.

13. The image processing apparatus according to claim 2, wherein, in a case where the job is set to print a plurality of copies, the hardware processor switches a mode set in a job to the first mode when the mode set in the job is the second mode.

14. The image processing apparatus according to claim 1, wherein the hardware processor enables an instruction according to a user determination with respect to a judgment result in the predetermined mode.

15. The image processing apparatus according to claim 14, wherein the hardware processor replaces the original image with the inspection image when the inspection image is judged to be normal by judgment in the predetermined mode and an instruction based on user determination indicating that the inspection image is normal is accepted, or when the inspection image is judged to be abnormal by judgment in the predetermined mode and an instruction based on user determination indicating that the inspection image is normal is accepted.

16. The image processing apparatus according to claim 1, wherein the hardware processor performs control to output a job having an inspection image and also, while making the judgment, assigns a next image of a discharge-completed image as an inspection image to be output next when a current inspection image is judged to be normal by judgment in the predetermined mode and an instruction based on the user determination indicating that the current inspection image is normal is accepted, or when the current inspection image is judged to be abnormal by judgment in the predetermined mode and an instruction based on the user determination indicating that the current inspection image is normal is accepted.

17. The image processing apparatus according to claim 1, wherein the hardware processor performs control to output a job having an inspection image and also, while making the judgment, when an instruction based on user determination indicating that a current inspection image is abnormal is accepted after judgment in the predetermined mode, assigns the judged image as an inspection image to be output next.

18. The image processing apparatus according to claim 17, wherein the hardware processor edits the judged current inspection image to output next.

19. The image processing apparatus according to claim 1, wherein the hardware processor performs control to output a job having an inspection image and also, while making the judgment, when an instruction based on user determination indicating that the inspection image is abnormal is accepted after judgment in the predetermined mode, cancels output of the job.

20. The image processing apparatus according to claim 19, wherein the hardware processor performs control to cancel output of the job when editing of the inspection image is not allowed.

21. The image processing apparatus according to claim 1, wherein the original image and the inspection image are included in different jobs.

22. The image processing apparatus according to claim 21, wherein a job including the inspection image is a job in which a job including the original image is reprinted.

23. The image processing apparatus according to claim 1, wherein, when the inspection image is judged to be abnormal by the judgment, the hardware processor performs control to purge a recording medium judged to be abnormal or the recording medium judged to be abnormal and a recording medium staying within an image forming apparatus.

24. The image processing apparatus according to claim 1, wherein the original image is a raster image processor image or a read image of a proof output.

25. The image processing apparatus according to claim 1, wherein the inspection image is a read image of an actual print output.

26. The image processing apparatus according to claim 1, wherein, in a case where the number of images does not match between the original image and the inspection image, control is performed such that inspection is executed selectively on a predetermined page or error stop is enabled.

27. The image processing apparatus according to claim 1, wherein the inspection mode is set in units of at least one of a job, a sheet, a printing surface, and a predetermined region of a page.

28. A non-transitory recording medium storing a computer readable program executed in an image processing apparatus capable of judging a pass/fail for an inspection image which is an image of a job used for printing on a recording medium, by comparing the inspection image with an original image correlated with the inspection image,
    the program comprising judging a pass/fail for an image, wherein
    in the judging, in accordance with a predetermined inspection mode set for the job, the inspection image is judged to be abnormal when the inspection image and the original image match, and the inspection image is judged to be normal when the inspection image and the original image do not match.

29. The non-transitory recording medium storing the computer readable program according to claim 28, wherein, in the judging, in a case where the predetermined inspection mode is assigned as a second mode and another inspection mode set for the job is assigned as a first mode, in accordance with the first mode, the inspection image is judged to be normal when the inspection image and the original image match, and the inspection image is judged to be abnormal when the inspection image and the original image do not match.

* * * * *